United States Patent
Chen et al.

(10) Patent No.: US 9,851,986 B2
(45) Date of Patent: Dec. 26, 2017

(54) APPLICATION CONFIGURATION IN A VIRTUAL ENVIRONMENT

(71) Applicant: International Business Machines Corporation, Armonk, NY (US)

(72) Inventors: Li Long Chen, Beijing (CN); Holger Karn, Aidlingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/817,883

(22) Filed: Aug. 4, 2015

(65) Prior Publication Data
US 2017/0039078 A1    Feb. 9, 2017

(51) Int. Cl.
G06F 9/455    (2006.01)
G06F 9/46    (2006.01)
G06F 9/445    (2006.01)
G06F 9/50    (2006.01)

(52) U.S. Cl.
CPC ...... *G06F 9/44505* (2013.01); *G06F 9/45558* (2013.01); *G06F 9/5077* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 8,434,093 B2 | 4/2013 | Larimore et al. | |
| 8,464,242 B2 | 6/2013 | Lanner et al. | |
| 8,589,923 B2 | 11/2013 | Gupta et al. | |
| 2009/0204943 A1* | 8/2009 | Konduri | G06F 8/51 717/114 |
| 2011/0276621 A1 | 11/2011 | Edery et al. | |
| 2013/0054521 A1 | 2/2013 | Cai et al. | |
| 2013/0185408 A1 | 7/2013 | Ngo | |
| 2013/0198745 A1* | 8/2013 | De | G06F 9/45533 718/1 |
| 2013/0326505 A1 | 12/2013 | Shah | |
| 2014/0143769 A1* | 5/2014 | Nigul | G06F 8/71 717/171 |
| 2015/0106802 A1* | 4/2015 | Ivanov | G06F 9/45558 718/1 |

OTHER PUBLICATIONS

Disclosed Anonymously, "Method to optimize cloud delivery services, by recommending best-fit virtual machine image, to enhance user experience," Jan. 2013, 11 pages, IP.com Prior Art Database Technical Disclosure.

* cited by examiner

*Primary Examiner* — Lewis A Bullock, Jr.
*Assistant Examiner* — Melissa Alfred
(74) *Attorney, Agent, or Firm* — Hoffman Warnick LLC

(57) ABSTRACT

A method, system and program product for providing virtual configuration management for applications running in a virtual environment. A method is described that includes: receiving a request for application configuration information from a virtual machine for an application; retrieving a versioned configuration image for the application, wherein the versioned configuration image comprises formatted configuration information captured from a previously configured application; creating a configuration runtime instance from the versioned configuration image; and attaching the configuration runtime image to the virtual machine for the application.

20 Claims, 5 Drawing Sheets

APPLICATION CONFIGURATION IN A VIRTUAL ENVIRONMENT

TECHNICAL FIELD

The subject matter of this invention relates to application configuration, and more specifically to a system and method for configuring applications in a cloud based virtual machine environment.

BACKGROUND

Cloud computing continues to grow as a preferred platform for information technology (IT) solutions. For example, cloud computing allows enterprises to scale in or out servers very quickly to adapt to business needs. For instance, thousands of virtual machines (VMs) can be easily provisioned based on pre-built images in minutes. This allows, for example, applications such as Web servers to be provisioned in different data centers during peak times to handle high loads.

However, one of the challenges with provisioning large scale enterprise applications is that it can be time consuming and error prone to configure the applications consistently. In large scale systems, enterprise applications running on virtual machines have to for example be registered to load balancers, be connected to application servers, be set to cluster and session sharing, etc.

Currently, one such approach is to utilize script-based configuration automation with tools such as CHEF™ and URBANCODE™. However, when an application/virtual machine such as a Web server is configured with a script-based solution, it cannot be reused for some other context. Furthermore, the script has to be run every time a virtual machine is deployed to a new environment, which can be time consuming and error prone.

An alternative approach is to utilize VM image based deployment, in which the entire configuration is built into the VM image. The drawback of this approach is that the VM image can no longer be used when the environment changes. Accordingly, this approach lacks flexibility Accordingly, current approaches to configuring enterprise type applications in a VM environment lack effectiveness, efficiency, flexibility and reusability.

SUMMARY

The present disclosure provides a system and method of virtualizing application configurations for much more efficient and flexible VM provisioning and reuse in cloud environments. In the present approach, application configurations are captured, reused, and migrated in a virtual repository. Application context is dynamically constructed by attaching or detaching configurations for certain contexts to or from the VM. Accordingly, both VMs and configurations can be linked together based on business changes and can then be reused respectively to achieve much higher productivity with lower cost.

This approach decouples the relationship between applications and configurations, and thus changes the way configurations are created, used, and managed in cloud environments. Because application configurations are not physically coupled to VMs, a VM with an application does not have to be built differently for environment variations and there is no need to develop and maintain custom configuration scripts.

Furthermore, VM instances and configuration instances are associated with one another during runtime. Accordingly, both can be reused or migrated much more easily to meet the dynamic nature of business needs and the cloud infrastructure can respond to business changes more efficiently. Furthermore, application configurations are captured at a repository level, so the process does not depend on an application semantic context.

A first aspect provides a virtual configuration management system that manages configuration information for applications running in a virtual environment, comprising: a configuration repository emulator that processes a request for application configuration information from a virtual machine (VM) for an application; a configuration metadata repository for storing metadata associated with a plurality of applications; a versioned configuration image repository for storing versioned configuration images, each versioned configuration image associated with a previously configured application; and a configuration repository manager that manages the configuration repository emulator and generates a configuration repository runtime instance from a selected versioned configuration image for the application.

A second aspect provides a computer program product recorded on a computer readable storage medium, which when executed by a computing platform, provides virtual configuration management for applications running in a virtual environment, the computer program product comprising: program code that processes requests for application configuration information from a virtual machine for an application; program code that retrieves a versioned configuration image for the application, wherein the versioned configuration image comprises formatted configuration information captured from a previously configured application; program code that creates a configuration runtime instance from the versioned configuration image; and program code for applying the configuration runtime image to the virtual machine for the application.

A third aspect provides a method of providing virtual configuration management for applications running in a virtual environment, the method comprising: receiving a request for application configuration information from a virtual machine for an application; retrieving a versioned configuration image for the application, wherein the versioned configuration image comprises formatted configuration information captured from a previously configured application; creating a configuration runtime instance from the versioned configuration image; and attaching the configuration runtime image to the virtual machine for the application.

BRIEF DESCRIPTION OF THE DRAWINGS

These and other features of this invention will be more readily understood from the following detailed description of the various aspects of the invention taken in conjunction with the accompanying drawings in which.

Figure 1:
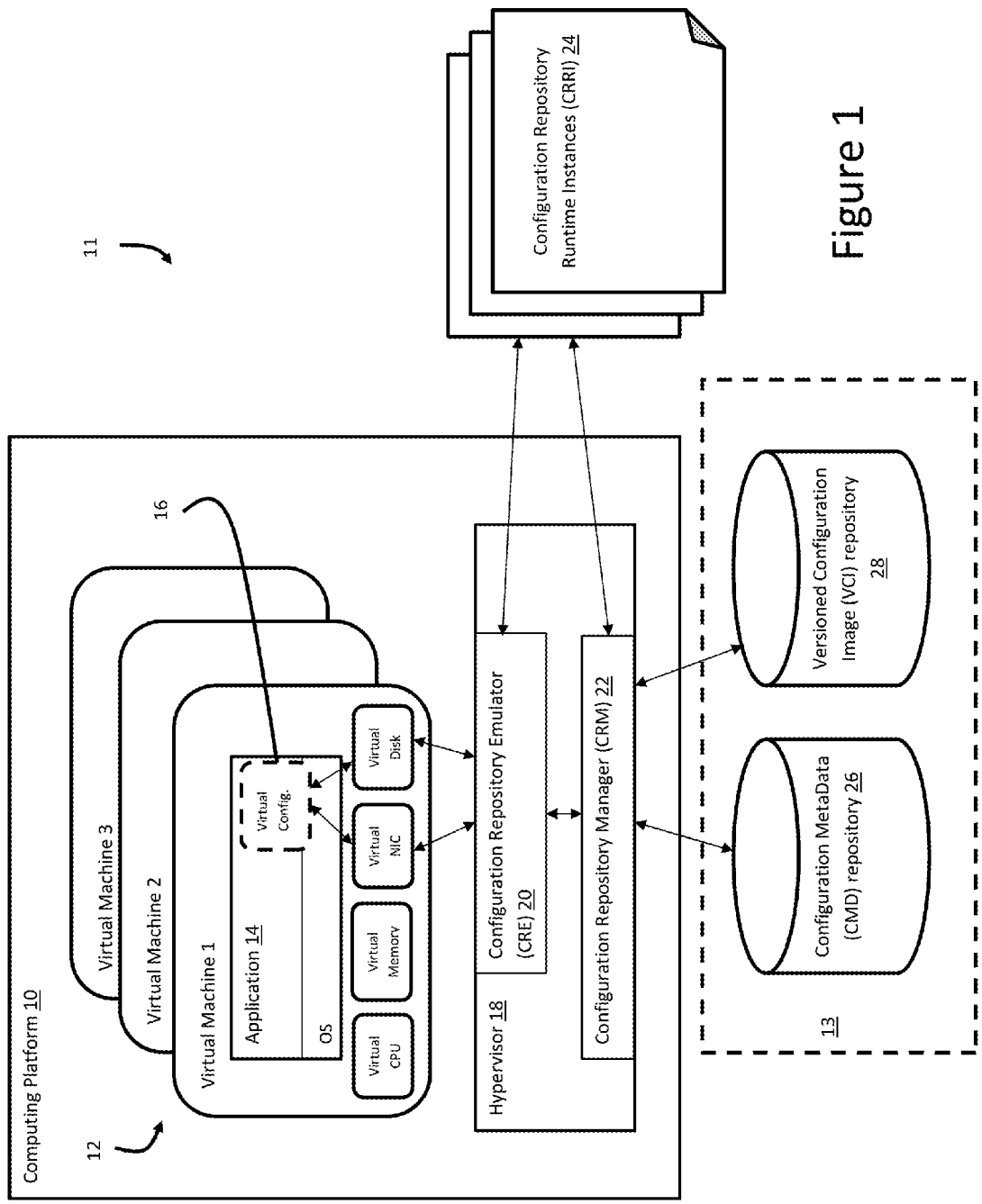
FIG. 1 shows a virtual configuration management system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a virtual configuration management system 11 that manages configuration information for applications running in a virtual environment, such as a cloud computing environment or the like. In this embodiment, virtual configuration management system 11 is integrated with a computing platform 10 configured to host a set of virtual machines (VM) 12. Computing platform 10 may for example include a physical machine or set of machines. Each VM 12 includes an application 14, such as a Web server, file or application server, middleware, tools, etc., as well as an associated operating system (OS). A typical VM 12, as shown, includes a virtual central processing unit (CPU), virtual memory, virtual network interface controller (NIC) and virtual disk. Each VM 12 is instantiated with a virtual machine image that is loaded and run on the computing platform 10.

Computing platform 10 also includes a hypervisor 18 that is responsible for handling services associated with each VM 12. In particular, the hypervisor 18 provides virtual disks and a virtual network to the VM 12. Accordingly, when VM 12 writes/reads data to/from a file system or remote database, hypervisor 18 writes/reads the data to/from a virtual disk or network, which is transparent to the application running on VM 12. Thus, as described herein, hypervisor 18 is also utilized to intercept write/read requests for configuration management purposes.

As noted, in order for the application 14 to behave correctly, the application 14 must be properly configured when the virtual machine image is loaded and launched. The present solution automates this by utilizing a virtual configuration 16 that is implemented separately from the virtual machine (VM) image. In particular, whenever a new VM 12 is launched with an application 14, a virtual configuration 16, if available, is loaded by the virtual configuration management system 11 on the fly for the application 14. In addition, whenever configuration changes are made to an application (or a new configuration is utilized), a new virtual configuration is saved by the configuration management system 11. This thus allows application configurations to be reused in a dynamic fashion.

Virtual configuration management system 11 generally includes: a configuration repository manager (CRM) 22 that is responsible for the overall management of the various processes described herein including managing configuration information for a plurality of applications running on a set of virtual machines; a configuration repository emulator (CRE) 20 that essentially acts as a proxy intercepting and redirecting configuration requests and information; a configuration metadata (CMD) repository 26 for storing metadata about the application 14; and a versioned configuration image (VCI) repository 28 for storing formatted configuration files captured from other applications (CMD repository 26 and VCI repository 28 generally referred to as configuration repository 13). As described herein, CRM 22 is responsible for generating configuration repository runtime instances 24 that comprise virtual configuration files that have been converted to an appropriate runtime format for an associated application 14.

The process of attaching a virtual configuration 16 to an application 14/VM 12 may be implemented as follows. When an application 14 is launched, CRE 20 intercepts a request from the VM 12 that a virtual configuration 16 is required for application 14. CRE 20 then interfaces with CRM 22 to retrieve a versioned configuration image (VCI) from VCI repository 28. Each VCI essentially comprises a previously stored and formatted version of a configuration. In this case, the VCI is retrieved by CRM 22 based on a request from the hypervisor 18. When the VCI is originally captured to VCI repository 28, the application and operating system information is stored to the VCI (e.g., WebSphere 8.5.1+LINUX). If a configuration needs to be attached to a given application on VM 12 (e.g., Websphere 8.5.5+AIX), the system will just search for a VCI built for the desired application and operating system, e.g., WebSphere 8.5.5+AIX.

Once the appropriate VCI is retrieved, a configuration repository runtime instance (CRRI) 24 is created and initiated by CRM 22, and registered to CRE 20. CRRI encodes the virtual configuration 16 in a runtime format suitable for the requesting VM 12. Each CRRI 24 thus serves as a virtual configuration that may comprise, e.g., a virtual file system, virtual server, or virtual database.

CRM 22 then links CRE 20 to the VM 12, and CRE 20 applies the generated CRRI 24, i.e., the virtual configuration 16, to VM 12, which is used by VM 12 to instantiate application 14. The virtual configuration 16 may be "detached" by simply reversing the described process. A migration process may be implemented by attaching and detaching a virtual configuration 16.

The process of capturing/storing a new or modified configuration may be implemented as follows. The first step involves registering application related information, referred to as configuration metadata (CMD) and storing the metadata in CMD repository 26. CMD for an application includes, e.g., where/how the application configurations are stored, how the application connects to CMD repository 26, the user ID of the administrator, any protocol information, file formats being used (e.g., extensible markup language "XML"), any properties, data tables, etc. Once the metadata is stored, CRE 20 is able to intercept and monitor new configuration changes written within the virtual configuration management system 11. When changes to an existing configuration or a new configuration are detected, CRM 22 creates a new VCI and captures the detected configurations parameters.

Figure 2:
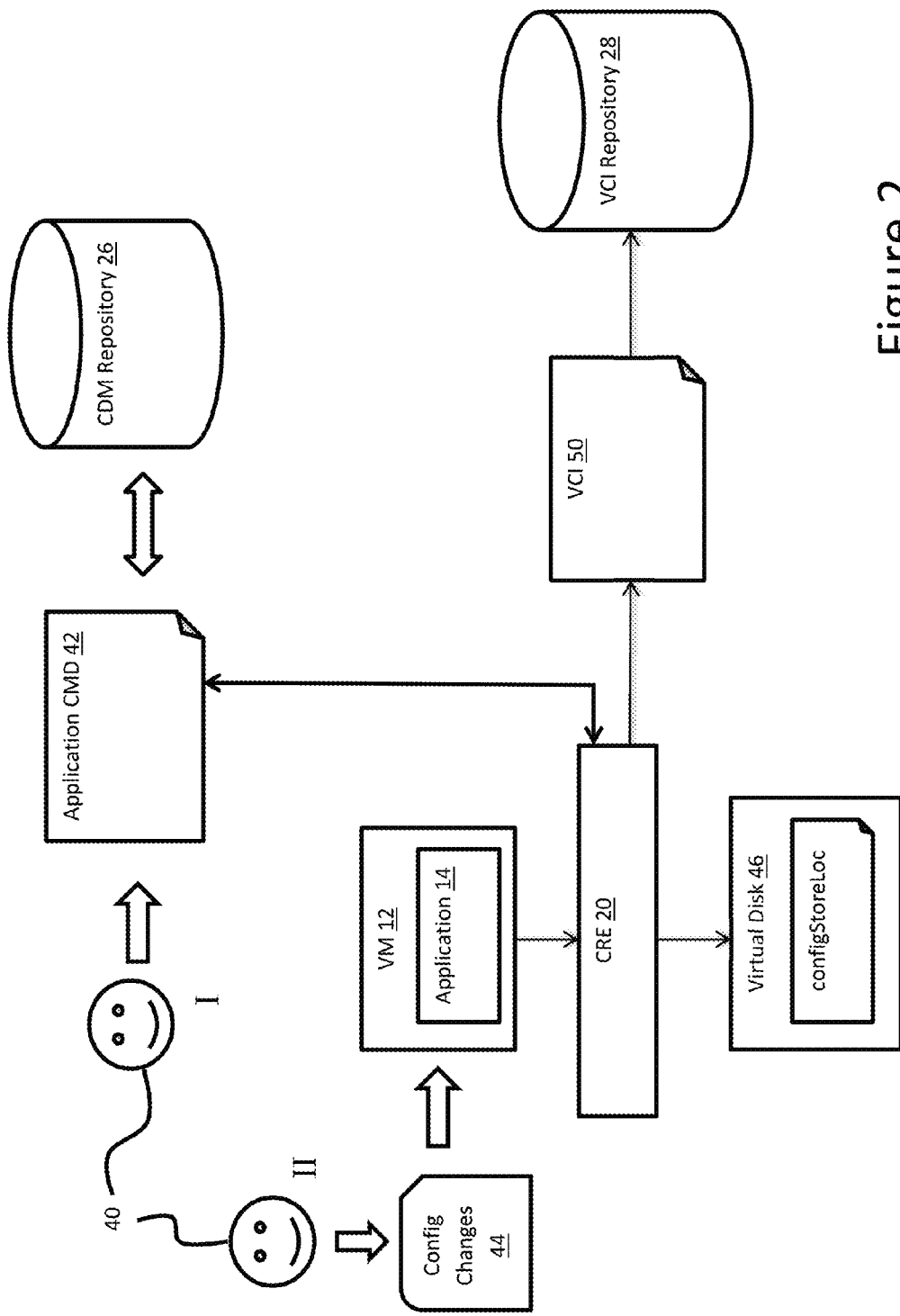
FIG. 2 shows an overview of capturing virtual configurations according to embodiments.

FIG. 2 depicts an overview of this process. Initially, at I, the administrator 40 registers the CMD 42 for an application, which stores the CMD 42 in CMD repository 26. For example, assume the application comprises a web server platform such as WebSphere®. The following CMD information may be registered:
  configSrcType: File
  configStoreLoc:    /usr/WebSphere/AppServer/profiles/<nodename>/config
  configProcess: Java
  configUserID: admin
  otherAttributes: . . .
In this example, the application configurations are stored on a virtual disk 46 at a location specified by configStoreLoc with a process specified by configProcess with the user ID specified by configUserID. With this metadata, CRE 20 is able to operate as a file/folder proxy that intercepts any future read or write operations to this location. Accordingly, CRE 20 is able to detect requests regarding stored configurations and is able to write configuration changes to the configStoreLoc location. Thus, parameters from a dynamically generated virtual configuration can be saved "locally" for future use.

Further, at II, when configuration changes 44 are made by the admin 40, CRE 20 captures the changes 44 and creates a new VCI 50, which can be stored in VCI repository 28. For example, the intercepted information may comprise changes to enable Web Sphere security with an LDAP user registry that specifies various configuration parameters such as hostname, port, etc. For instance, admin 40 may specify a new directory type/server, having a primary host name and port. The changes would be generated into a data stream such as:

```
-<userRegistries xmi:type= "security:LDAPUserRegistry" xmi:id=
"LDAPUserRegistry_1" serverId= "" serverPassword= "xor" realm= ""
ignorecase = true
useRegistryServerId = true primaryAdminId = ""
type= "Directory Server"
sslEnabled=false sslConfig= 'lexdevmagr/Default ... >
    <searchFilter xmi:id= "LDAPSearchFilter_1" userFilter=
    "(&(uid=%v)(objectclass=ePerson))" ... >
    <hosts xmi:id = "EndPoint" host = "lex1dap01.lexdev.abc.com"
    port= "333"/>
```

These configuration changes are stored by the application 14 (e.g., WebSphere) to a file such as security.xml. In addition, CRE 20 intercepts, reformats, and stores the configuration details to a pluggable and reusable VCI 50, such as an xml file: WebShere VCI V1.2

```
(security.xml, < ... >)
(server.xml, < ... >)
(configName, configValue) ...
```

This formatted configuration is stored in VCI repository 28 and can then be later converted to a runtime file (i.e., CRRI 24) and attached (or detached) to a VM 12/application 14 at runtime. In brief, a VCI includes two parts, metadata and concrete configurations. An illustrative example may be something as follows.

```
<VCI id="xxxxxxxxxx">
    <MetaData>
        <App>App XYZ V7.5 </App>
        <OS>LINUX UBUNTU 12.3<OS>
        <ConfigRepo>
            <Type>File</Type>
            <Location>...</Location>
            <Access>...</Access>
            ......
        </ConfigRepo>
        <ConfigMapping>...</ConfigMapping>
        ......
    </MetaData>
    <Configurations>
        <Config id="???"><Key>??</Key><Value>??<Value><Config>
        <Config id="???"><Key>??</Key><Value>??<Value><Config>
        <Config id="???"><Key>??</Key><Value>??<Value><Config>
        ......
    </Configurations>
</VCI>
```

Figure 3:
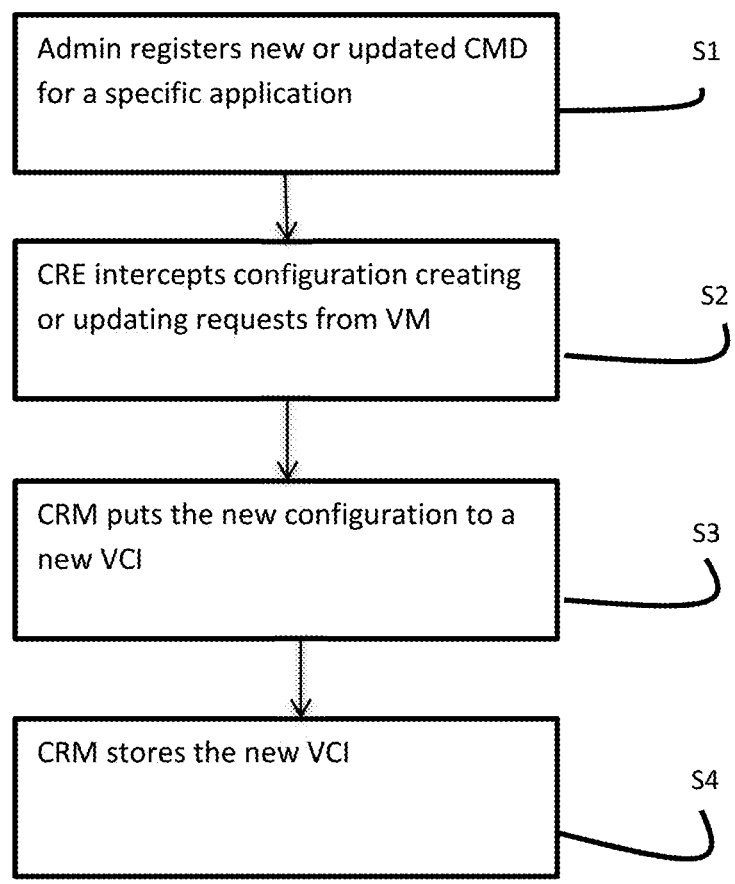
FIG. 3 shows a flow diagram of capturing a virtual configuration according to embodiments.

Referring now to FIG. 3, a flow diagram showing the process of capturing and storing new VCIs 50 is provided as described in FIG. 2. First, at S1, the admin 40 registers a new or updated CMD for a specific application 14. This is generally accomplished via a graphical user interface associated with the application 14. At S2, CRE 20 intercepts a request from the associated VM 12 to create or update the configuration, and at S3, CRM 22 formates the updated configuration to a new VCI 50. In addition, at S4, CRM 22 stores the new VCI 50 in VCI repository 28.

Figure 4:
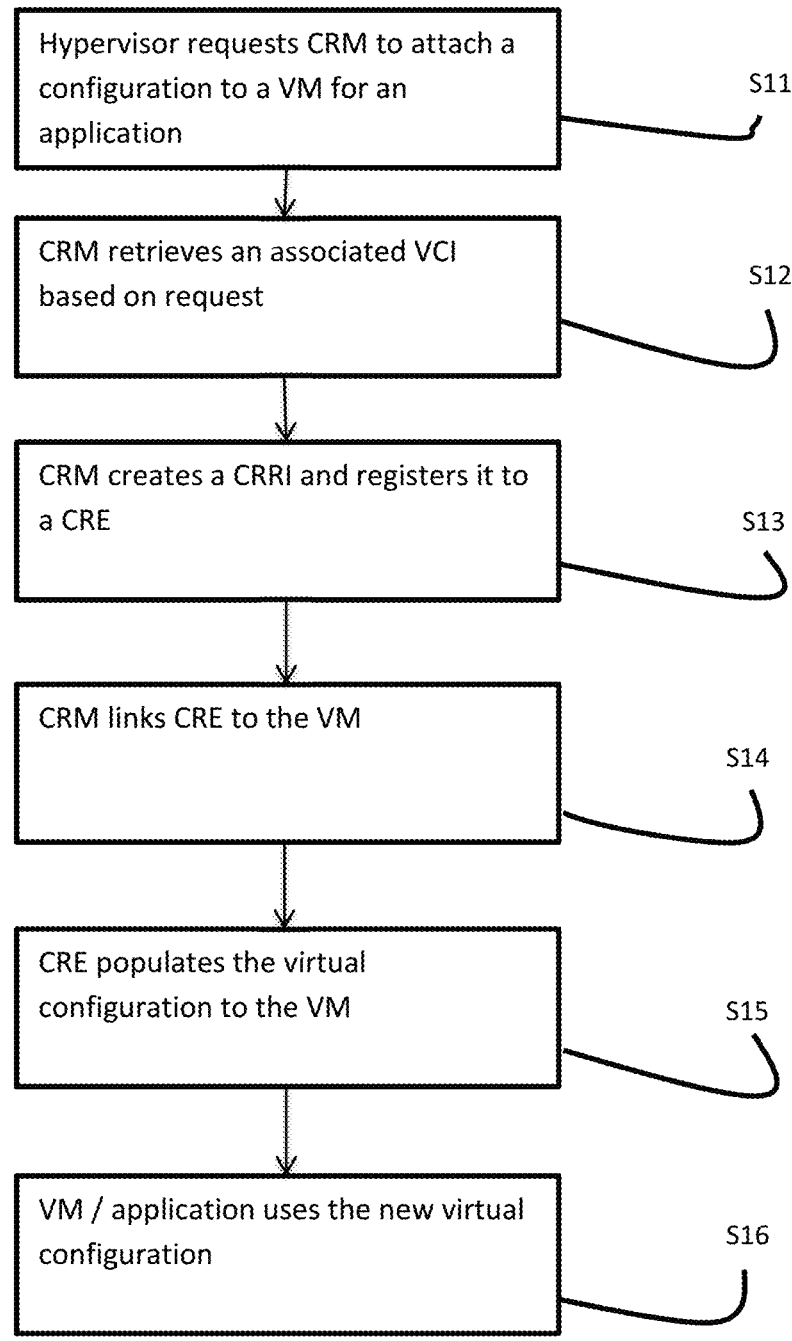
FIG. 4 shows a flow diagram of retrieving a virtual configuration according to embodiments.

FIG. 4 depicts a flow diagram showing the process for loading a virtual configuration 16 (as described with reference to FIG. 1). At S11, the hypervisor requests the CRM 22 to attach a configuration to a specified VM 12 for an associated application 14. At S12, CRM 22 retrieves an associated VCI 50 based on the request and at S13, CRM 22 creates a CRRI 24 and registers it to CRE 20. Next, at S14, CRM 20 links CRE 20 to the specified VM 12, and at S15, CRE populates the CRRI, i.e., virtual configuration 16 to the VM 12. At S16, the specified application 14/VM 12 then uses virtual configuration 16.

Figure 5:
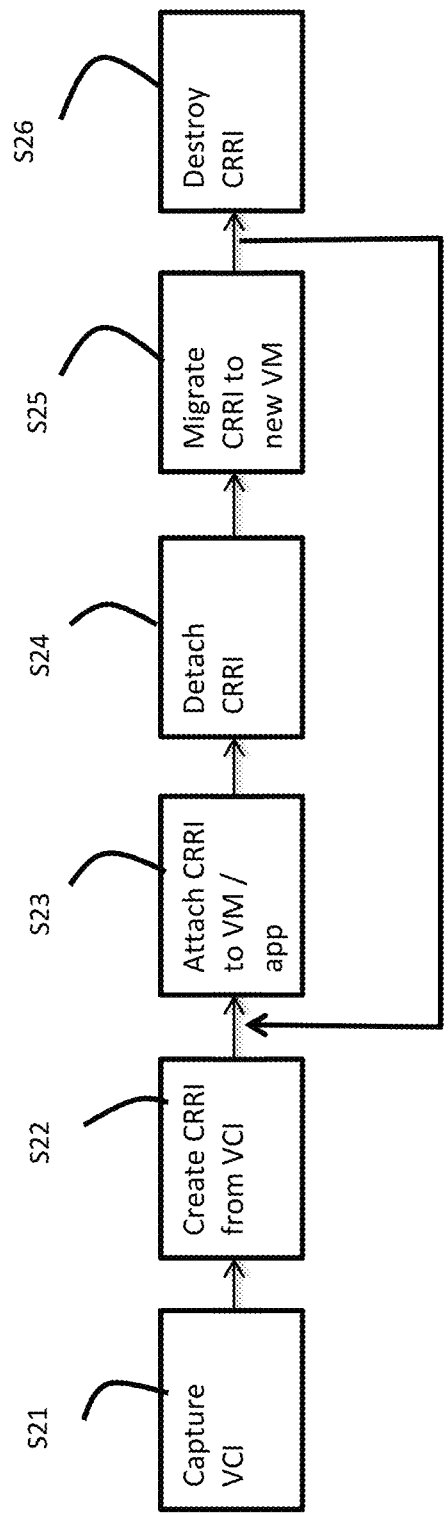
FIG. 5 shows a flow diagram of a virtual configuration lifecycle according to embodiments.

FIG. 5 depicts a lifecycle flow of a typical virtual configuration 16. At S21 a VCI 50 is captured and at S22 a CRRI is created from the VCI 50. The CRRI is attached to the application 14/VM 12 at S23, e.g., when provisioned, and then later detached at S24, e.g., when the VM 12/application 14 is decommissioned. The CRRI can also be migrated to a new VM at S25 and steps S22-S25 can be repeated. Finally, when the CRRI no longer has any viable use, the CRRI can be destroyed at S26.

Accordingly, a feature of the virtual configuration management system 11 is that application configurations (e.g., virtual hosts and authentication mechanisms configured on applications such as WebSphere) can be virtualized and shared. This is distinguishable from standard VM configurations (e.g., configuring CPU cores, memory capacity, disk size, etc).

Referring again to FIG. 1, aspects of the configuration management system 11, computing platform 10 and associated repositories may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing platform 10 may comprise any type of computing device and, and for example include at least one processor, memory, an input/output (I/O) (e.g., one or more I/O interfaces and/or devices), and a communications pathway. In general, processor(s) execute program code which is at least partially fixed in memory. While executing program code, the processor(s) can process data, which can result in reading and/or writing transformed data from/to memory and/or I/O for further processing. The pathway provides a communications link between each of the components in computing system. I/O can comprise one or more human I/O devices, which enable a user or other system to interact with computing system. The described repositories may be implementing with any type of data storage, e.g., databases, file systems, tables, etc.

Furthermore, it is understood that the virtual configuration management system 11 or relevant components thereof (such as an API component) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will, select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A virtual configuration management system that manages configuration information for applications running in a virtual environment, comprising:
    a computing platform having a processor and a memory that is configured to host a plurality of virtual machines (VM), wherein each VM includes an application and operating system;

a hypervisor that handles data read and write operations between a virtual storage and each VM, where the hypervisor includes a configuration repository emulator that intercepts and processes a request VM for a virtual configuration for an application being launched by the VM;

a configuration metadata repository for storing metadata associated with a plurality of applications;

a versioned configuration image repository for storing versioned configuration images, each versioned configuration image associated with a previously configured application; and a configuration repository manager that:
dynamically creates a configuration repository runtime instance from a selected versioned configuration image for the application being launched by the VM;
registers the configuration repository runtime instance to a configuration repository emulator;
links the configuration repository emulator to the virtual machine; and
attaches the configuration runtime instance to the virtual machine for the application, wherein the configuration repository runtime image includes the virtual configuration.

2. The system of claim 1, wherein the metadata for each application includes a location of a configuration file.

3. The system of claim 2, wherein the configuration repository emulator utilizes the location of the configuration file to intercept requests.

4. The system of claim 1, wherein the versioned configuration images are stored in an XML (extensible markup language) format.

5. The system of claim 1, wherein the versioned configuration images include a set of configuration parameters.

6. The system of claim 1, wherein the configuration repository runtime instance is configured for the VM requesting configuration information for the application.

7. The system of claim 1, further comprising an interface for registering metadata for a selected application.

8. A computer program product recorded on a non-transitory computer readable storage medium, which when executed by a computing platform, provides virtual configuration management for applications running in a virtual environment, the computer program product comprising:
program code for processing requests from a virtual machine for a virtual configuration for an application being launched on the virtual machine;
program code for retrieving in response to the request a versioned configuration image for the application, wherein the versioned configuration image comprises formatted configuration information captured from a previously configured application;
program code for dynamically creating a configuration repository runtime instance from the versioned configuration image in response to a request, wherein the configuration repository runtime instance includes the virtual configuration;
program code for registering the configuration repository runtime instance to a configuration repository emulator;
program code for linking the configuration repository emulator to the virtual machine; and
program code for applying the configuration repository runtime image to the virtual machine for the application.

9. The computer program product of claim 8, wherein the versioned configuration image is stored in an XML (extensible markup language) format.

10. The computer program product of claim 8, further comprising:
program code for registering metadata for a new or updated application; and
program code for intercepting configuration information from the new or updated application.

11. The computer program product of claim 10, further comprising:
program code for reformatting the configuration information into a new versioned configuration image; and
program code for storing the new versioned configuration image in a repository.

12. The computer program product of claim 10, wherein the metadata includes a location of a configuration file for the new or updated application.

13. The computer program product of claim 12, wherein the location of the configuration file is utilized to intercept requests.

14. The computer program product of claim 8, wherein the versioned configuration image includes a set of configuration parameters.

15. A method of providing virtual configuration management for applications running in a virtual environment, the method comprising:
receiving a request from a virtual machine for a virtual configuration for an application being launched by the virtual machine;
retrieving in response to the request a versioned configuration image for the application, wherein the versioned configuration image comprises formatted configuration information captured from a previously configured application;
dynamically creating a configuration repository runtime instance from the versioned configuration image in response to the request;
registering the configuration repository runtime instance to a configuration repository emulator;
linking the configuration repository emulator to the virtual machine; and
attaching the configuration repository runtime image to the virtual machine for the application, wherein the configuration repository runtime image includes the virtual configuration.

16. The method of claim 15, wherein the versioned configuration image is stored in an XML (extensible markup language) format.

17. The method of claim 15, further comprising:
registering metadata for a new or updated application; and
intercepting configuration information from the new or updated application.

18. The method of claim 17, further comprising:
reformatting the configuration information into a new versioned configuration image; and
storing the new versioned configuration image in a repository.

19. The method of claim 17, wherein the metadata includes a location of a configuration file for the new or updated application.

20. The method of claim 19, wherein the location of the configuration file is utilized to intercept requests.

* * * * *